L. PRINCE.
Combined Hay-Rack and Fence.
No. 213,448.        Patented Mar. 18, 1879.
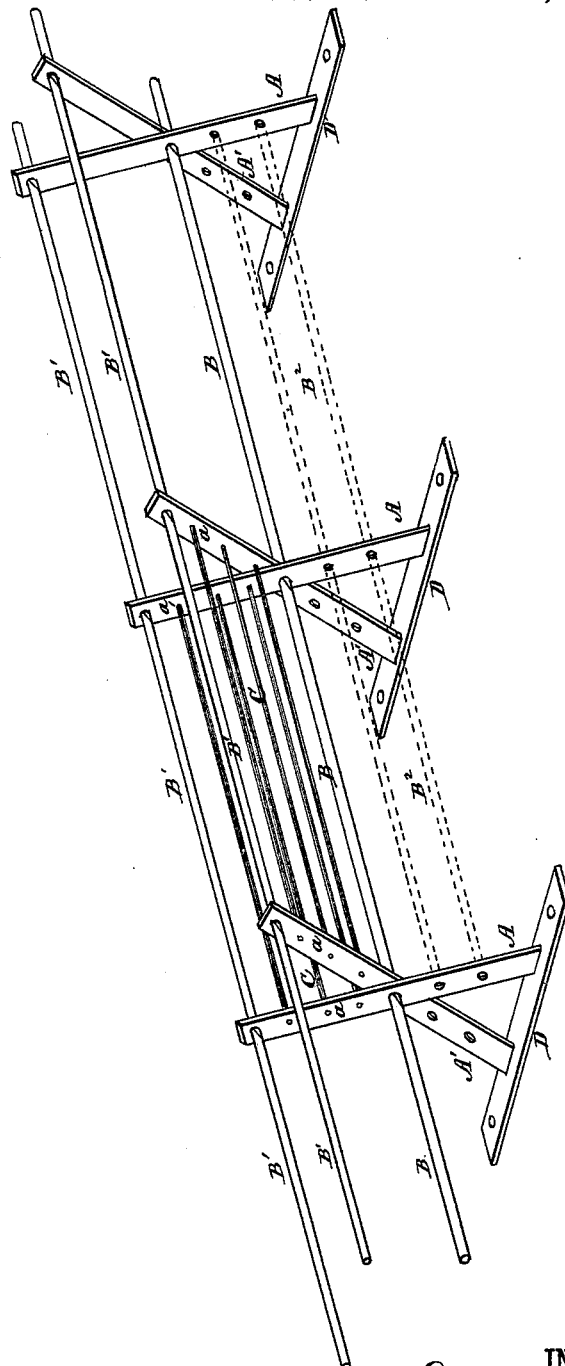
WITNESSES:                    INVENTOR:
A. B. Robertson              Louis Prince
Edw. W. Byrn.                BY 
                             ATTORNEYS.

UNITED STATES PATENT OFFICE.

LOUIS PRINCE, OF NASHVILLE, OHIO.

IMPROVEMENT IN COMBINED HAY-RACK AND FENCE.

Specification forming part of Letters Patent No. 213,448, dated March 18, 1879; application filed October 16, 1878.

*To all whom it may concern:*

Be it known that I, LOUIS PRINCE, of Nashville, in the county of Holmes and State of Ohio, have invented a new and Improved Combined Hay-Rack and Fence; and I do hereby declare that the following is a full, clear, and exact description of the same, reference being had to the accompanying drawing, forming part of this specification, in which the figure is a perspective view.

My invention relates to a hay-rack and fence so constructed that the fence may at one or more of its panels be supplied with additional bars or rails to convert said panels into racks, which, while having all of the functions of a rack for feeding cattle, also give continuity to the fence, the said device being specially applicable to separating the hay-stacks, or barn-yard containing the hay-stacks, from the field or pound in which the cattle roam.

In the drawing, A A' represent inclined bars or stakes, which cross each other at or near the middle, and are connected at this point by a longitudinal bar, B, passing through holes or mortises in said stakes. In the upper ends of said stakes are arranged, in suitable holes or mortises, other longitudinal bars, B¹, which, together with the bar B and crossed stakes, constitute the fence. If, however, small stock is to be excluded, bars B² (shown in dotted lines) are arranged in the lower portion of the stakes, beneath the middle bar, B.

In the upper portion of the stakes of this fence I form holes, mortises, or slots $a$, to form seats, in which are entered the ends of rails C, which are placed close enough together to hold the hay or fodder, but far enough apart to permit the animal to feed from between the same. These rails, it will be seen, form, with the stakes and the top bars of the fence, a diverging rack, into the open upper end of which the provender is thrown.

In constructing the device, the bars B B¹ are made continuous by lap-joints, or they may be connected in any other suitable manner. The stakes also may be made sharp and driven into the ground, or they may be provided with tenons at their lower ends adapted to enter mortises in base-bars D, which are pinned to the ground.

In arranging in the stakes the seats $a$ for the rails C, I do not confine myself to mortises or closed slots into which the rails have to be inserted by longitudinal movement, but may employ open slots to permit the lateral insertion of the rails, or use any other means for seating the rails that may be found desirable.

In applying my invention to use, the fence may be constructed around the hay-stack in the field, in which relation the cattle are kept from a wasteful use of the hay; or the fence may be placed around the barn-yard which separates the hay-stack from the field or pound, in which relation the cattle are both kept from a wasteful use of the hay, and the herdsman enabled to feed them without going into the field or pound.

Having thus described my invention, what I claim as new is—

The fence herein described, consisting essentially of the inclined bars A A', permanent bars $b\ b'$, and removable rods $a$, as described.

LOUIS PRINCE.

Witnesses:
CHAS. A. PETTIT,
THOMAS P. SIMPSON.